May 19, 1959
P. M. SHELTON
2,886,935
BOOT FOR WALKING HORSES
Filed Jan. 9, 1956
2 Sheets-Sheet 1
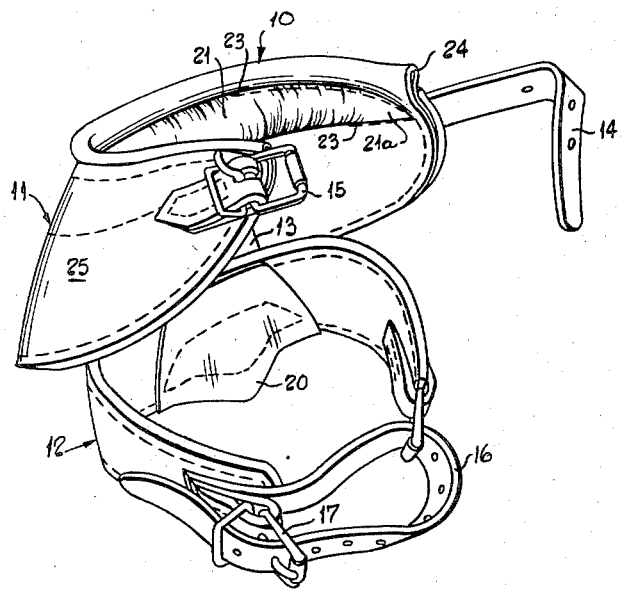
Fig-1
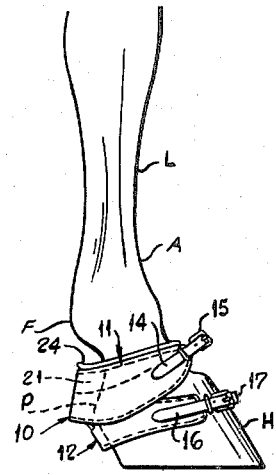
Fig-2
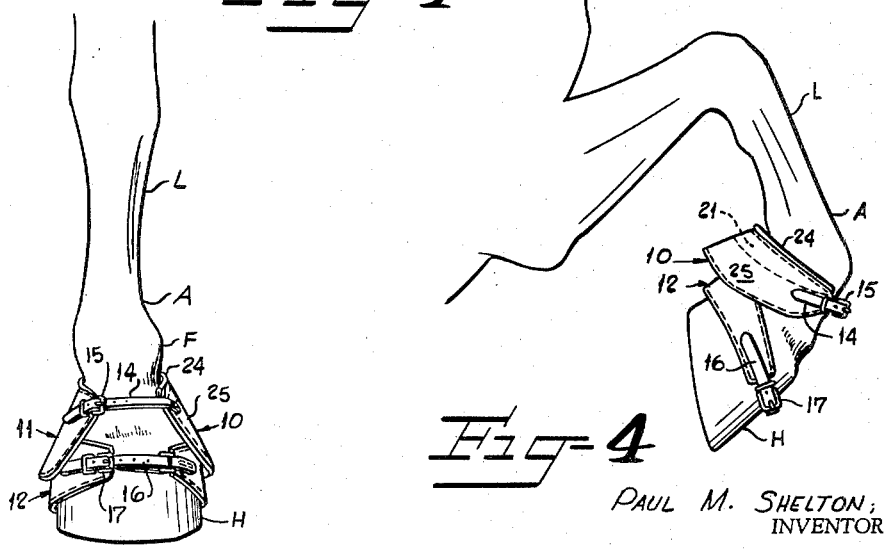
Fig-3
Fig-4
PAUL M. SHELTON,
INVENTOR.
BY Eaton + Bell
ATTORNEYS

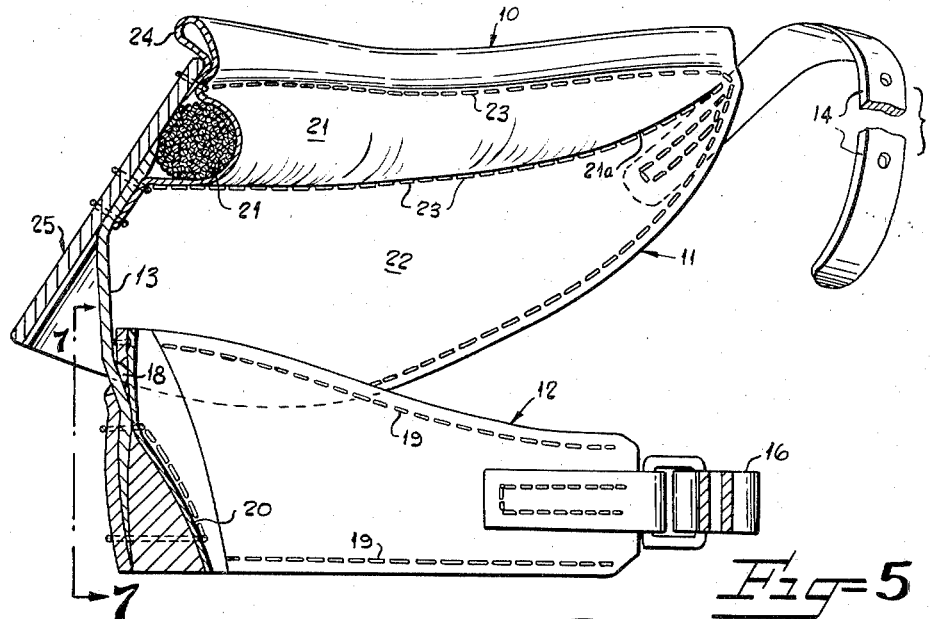
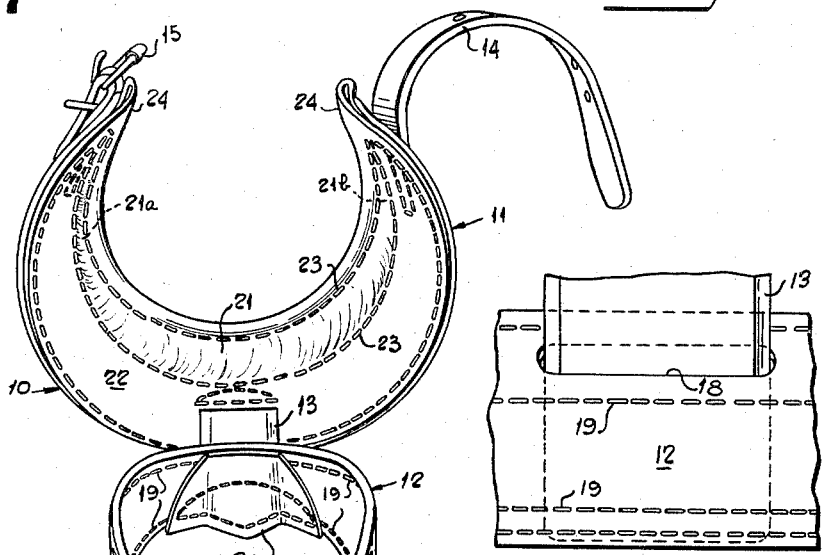
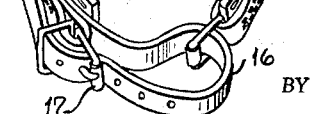
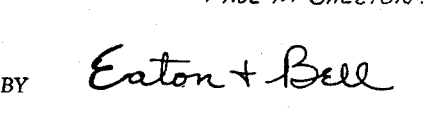
INVENTOR:
PAUL M. SHELTON.
BY Eaton + Bell
ATTORNEYS ations
United States Patent Office 2,886,935
Patented May 19, 1959

2,886,935

BOOT FOR WALKING HORSES

Paul M. Shelton, Chatham, Va.

Application January 9, 1956, Serial No. 558,007

3 Claims. (Cl. 54—71)

This invention relates to boots for horses and, more particularly, to a boot for training horses to lift their front legs very high for the purpose of show.

Heretofore, in training walking horses to lift their front legs very high it has been the practice to secure exposed chains to the front legs of the horse, which chains in due time would cause sores on the legs but would accomplish their intended purpose of making the horse lift his legs high since the horse believes that by lifting and kicking his legs high in the air, he can throw off the chains. Other means have been used for training horses to lift their legs high such as burning the horse's leg with acid, mustard oil, or driving nails in the hooves, the pain of which would make the horse lift his legs high as any human would do, for example, if he steps on a nail in a plank. All these practices of training horses have recently been banned and, any horses showing signs of having been treated by such inhuman practices are now disqualified from being shown.

It is a primary object of this invention to provide an improved boot for a walking horse for training the horse to lift his front legs high, and to provide a boot which may be left on the horse's front legs during the show.

It is a more specific object of this invention to provide a boot for a walking horse comprising a top leather section or bell, a leather bottom section or quarter, a flexible leather strap hingedly connecting the bell and quarter sections together at the rear of the horse's hoof, a lug or frog carried by the quarter section seatable in the fourchette of the horse's hoof to maintain the boot in proper position relative to the hoof, and to provide in the bell section an arcuate weight or bulging member preferably in the form of a heavy cable or chain formed, for example, from lead which is covered by leather, and extends inwardly from the bell section to frictionally engage the horse's leg in the area around the pastern and fetlock which is a tender and sensitive area. The frictional engagement of the weighted rope or chain with the leg of the horse will cause him to lift his leg to try to dislodge the boot therefrom. Thus, the desired result of the horse lifting his front legs in a high manner is accomplished.

It is also an object of the invention to provide an improved boot for a walking horse which although accomplishing the desired purpose of making the horse lift his front legs very high will not cause sore spots or the like on his legs.

It is a further object of the invention to provide a boot for a walking horse wherein the bell or top section is provided with a flat outer surface to receive the impact of the horse's rear legs when the horse accidentally kicks himself to thereby prevent any injury to the front legs.

Some of the objects of the invention having been stated, other objects will appear as the description proceeds when taken in connection with the accompanying drawings, in which Figure 1 is a perspective view of the boot;

Figure 2 is a side elevation showing the boot positioned on the front leg of a horse;

Figure 3 is a front elevation of the boot looking from the right of Figure 2;

Figure 4 is a side elevation similar to Figure 2 but showing the upper portion of the boot in the position that the same will be moved when the horse lifts his foot;

Figure 5 is a vertical section on an enlarged scale through the medial portion of the boot;

Figure 6 is a perspective view similar to Figure 1 but showing the upper portion bent away from the lower portion for purposes of clarity;

Figure 7 is a fragmentary elevation taken along line 7—7 in Figure 5 and showing the manner in which the flexible leather strap hingedly connects the bottom of the boot.

Referring more specifically to the drawings, the reference numeral 10 broadly indicates the boot for walking horses which is shown as having a substantially U-shaped top leather section or bell 11 and a substantially U-shaped leather bottom section or quarter 12 hingedly connected together by a flexible leather strap 13. The bell 11 and quarter 12 are each provided with straps and buckles 14, 15, 16 and 17, respectively, for positioning the walking boot on the leg of the horse as shown in Figures 2, 3 and 4. The strap 13 hingedly connecting both portions of the boot together has its lower end positioned in an aperture or slot 18 formed in the lower section 12 (Figure 7) wherein the same is secured by stitching 19 to the lower section 12. The upper portion of the strap 13 is also similarly connected as by stitching to the bell 11. A lug or frog 20, preferably formed of leather, is suitably secured as by stitching to the quarter section 12 which lug serves for properly seating the boot in the fourchette of the horse's hoof to maintain the boot in proper position relative to the hoof.

The upper portion of the bell 11 is provided with an arcuate or U-shaped weight or bulging member 21 extending inwardly from the inner surface of the bell and preferably being formed of a cable or chain of any suitable material, but preferably lead to give added weight and thereby increase the frictional irritation on the horse's leg. The inwardly extending bulging member 21 has a larger diameter at its medial portion than its ends 21a, 21b which are tapered to eliminate any rough edges which might injure the leg of the horse when the boot is positioned thereon. A layer of soft leather 22 is secured to the inner surface of the bell 11 as by stitching 23 which stitching serves to maintain the arcuate weight in a secure manner and to prevent the same from being displaced while the boot is being carried by a horse. The inner layer of leather 22 is turned back at the top of the bell 11 to present a cuff 24 along the upper edge of the bell to prevent the horse's leg from being irritated or chafed to cause sores.

Referring now to Figures 2, 3 and 4, the boot 10 is positioned on the leg of the horse by alining the frog or lug 20 with the rear of the horse's hoof and seating the same in the fourchette thereof and then tightly securing the same to the hoof by the strap and buckle 16 and 17. Now, the opposite ends of the bell 11 are secured together by engaging the strap 14 in the buckle 15. As will be observed in the drawings, the strap 14 is always positioned tight enough to draw in the opposite edges of the bell 11 but not tight enough to prevent the bell from moving upwardly and downwardly as the horse lifts its leg. As will be observed in the drawings, the bell 11 is positioned on the leg of the horse to permit the inwardly extending weight member 21 to frictionally engage the horse's leg between the pastern P and the fetlock F when the horse raises his leg. The boot in no way interferes with the movements of the horse and particularly the ankle portion A since the boot is positioned therebelow.

When the boot is in the position shown in Figure 2, the side portions of the weight member 21 will frictionally engage the horse's leg to a sufficient extent to cause him to lift his leg into the position shown in Figure 4 to try to throw the boot off his leg. In the position shown in Figure 4, the weight or bulging member 21 will continue to frictionally engage the leg of the horse and cause him to quickly lower his foot to again repeat the attempt to throw the boot off. Thus, the desired results of training the horse to lift and lower his front legs in a high prancing movement are obtained.

As will be observed in Figures 1 and 5, the bell 11 is provided with a substantially flat outer surface 25 to prevent the rear hoofs of horses from striking and injuring the front legs. By the surface 25 being flat, the rear hoofs slide off the bell 11 without damaging the leg. It has been observed that this flat surface affords a much greater protection to the horse's legs over a convex surface since the convex surface upon being struck by the rear hoofs of the horse would tend to cave inwardly and thus form projecting portions on the inner surface which would soon injure the legs of the horse.

Accordingly, there has been provided a novel boot for walking horses for training the same to lift their legs in a high manner for purposes of show and which lifting is accomplished without irritating the horse's leg to the extent of causing sores or the like. Also, there has been provided a boot for walking horses which gives protection to the legs of the horse in case the rear hoofs accidentally strike the same.

In the drawings and specification there has been set forth a preferred embodiment of the invention and, although specific terms are employed, they are used in a generic and descriptive sense only and not for purposes of limitation, the scope of the invention being defined in the claims.

I claim:

1. A boot for horses comprising a bell, a quarter, means hingedly connecting said quarter and bell together, said quarter having a curved wall provided with a slot therein, said means comprising a flexible strap fastened to the inner surface of said bell and having its lower end positioned in said slot provided in the wall of said quarter, stitching securing said strap to said quarter below said slot, a metallic cable positioned on the inner surface of said bell and extending inwardly therefrom, said cable being adjacent and substantially parallel to the upper edge of the bell for frictionally engaging the horse's leg to make the horse lift his leg to obtain the desired reach for the purpose of show, and leather covering said cable to prevent the cable from irritating the horse's leg to the extent of causing sores and the like.

2. A boot for horses comprising a bell, a quarter, means hingedly connecting said quarter and bell together, the top edge of said bell having a cuff thereon, and bulging means secured to the inner surface of said bell and projecting inwardly from the bell adjacent the top edge of the bell and below said cuff for frictionally engaging the horse's leg whereby the horse will lift his leg to give the desired reach for the purpose of show.

3. A boot for horses comprising a top leather section, a bottom leather section, a flexible leather strap hingedly connecting the top and bottom sections together, bulging means extending inwardly from the inner upper surface of the top section for frictionally engaging the leg of the horse, said bulging means including a relatively heavy weight member and a soft, yieldable covering over the weight member, and said means having tapered end portions to prevent injury to the leg of the horse.

References Cited in the file of this patent

UNITED STATES PATENTS

| | | |
|---|---|---|
| 222,796 | Randall | Dec. 23, 1879 |
| 396,167 | Mason | Jan. 15, 1889 |
| 524,555 | Morgan | Aug. 14, 1894 |
| 2,470,195 | Thompson | May 17, 1949 |
| 2,483,065 | Schwartz et al. | Sept. 27, 1949 |